US012491460B2

(12) United States Patent
Jolliffe

(10) Patent No.: US 12,491,460 B2
(45) Date of Patent: Dec. 9, 2025

(54) DUCT MOUNTED FILTERING APPARATUS

(71) Applicant: Carrier Corporation, Palm Beach Gardens, FL (US)

(72) Inventor: Chrystal Jolliffe, London, OH (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 523 days.

(21) Appl. No.: 17/953,906

(22) Filed: Sep. 27, 2022

(65) Prior Publication Data
US 2023/0097000 A1 Mar. 30, 2023

Related U.S. Application Data

(60) Provisional application No. 63/250,384, filed on Sep. 30, 2021.

(51) Int. Cl.
B01D 46/00 (2022.01)
B01D 46/42 (2006.01)
B01D 46/52 (2006.01)

(52) U.S. Cl.
CPC ..... *B01D 46/0006* (2013.01); *B01D 46/4227* (2013.01); *B01D 46/521* (2013.01); *B01D 2265/028* (2013.01); *B01D 2279/50* (2013.01)

(58) Field of Classification Search
CPC ............ B01D 46/0006; B01D 46/0009; B01D 2279/50; B01D 46/10; B01D 46/4227; B01D 46/521; B01D 2265/028; F24F 13/28; F24F 13/085; F24F 8/10; F24F 1/0073

USPC ...... 55/506, 494, 491, 504, 505, 385.1, 482, 55/495, 498, 501, DIG. 31, DIG. 35
See application file for complete search history.

(56) References Cited

U.S. PATENT DOCUMENTS

| 2,077,951 | A | * | 4/1937 | Myers | B01D 46/12 55/504 |
| 2,081,553 | A | * | 5/1937 | Neeson | F24F 13/22 55/497 |
| 3,494,113 | A | * | 2/1970 | Kinney | B01D 46/0005 55/497 |
| 3,789,589 | A | * | 2/1974 | Delany | B01D 46/0006 55/502 |
| 5,030,264 | A | * | 7/1991 | Klotz | F02M 35/024 55/502 |
| 5,433,763 | A | * | 7/1995 | Shagott | A47L 5/38 55/374 |
| 5,458,667 | A | * | 10/1995 | Poggi, Jr. | B01D 46/0006 55/480 |
| 5,593,470 | A | * | 1/1997 | Shagott | A47L 5/38 55/357 |
| 5,716,115 | A | | 2/1998 | Anoszko | |

(Continued)

FOREIGN PATENT DOCUMENTS

CN 204806545 U 11/2015
CN 106091610 A 11/2016
(Continued)

Primary Examiner — Duane Smith
(74) Attorney, Agent, or Firm — CANTOR COLBURN LLP

(57) ABSTRACT

A filter support for mounting an air cleaning device includes an access panel, at least one support member extending from the access panel, and a latch mounted to the access panel. The latch is operable to selectively couple to the air cleaning device.

20 Claims, 5 Drawing Sheets

(56) References Cited

U.S. PATENT DOCUMENTS

| | | | | |
|---|---|---|---|---|
| 5,740,774 | A * | 4/1998 | Kennedy | B01D 46/10 55/480 |
| 5,843,198 | A | 12/1998 | Walker | |
| 5,944,860 | A * | 8/1999 | Mack | B01D 46/0005 55/497 |
| 6,264,713 | B1 * | 7/2001 | Lewis | B01D 46/521 55/502 |
| 6,387,164 | B1 * | 5/2002 | Cheng | F24F 8/192 55/483 |
| 6,502,909 | B1 * | 1/2003 | Swilik, Jr. | B01D 46/10 312/263 |
| 6,585,792 | B2 * | 7/2003 | Schneider | B01D 46/0005 55/385.2 |
| 6,749,657 | B2 * | 6/2004 | Felber | B01D 46/10 55/497 |
| 6,875,250 | B2 * | 4/2005 | Terlson | B01D 46/0002 55/497 |
| 7,147,685 | B2 * | 12/2006 | Lee | F24F 13/28 55/504 |
| 7,252,696 | B2 * | 8/2007 | Jenkins | B01D 46/0005 55/490.1 |
| 7,524,362 | B2 * | 4/2009 | Wu | B01D 46/0005 96/417 |
| 7,833,305 | B1 * | 11/2010 | Studer | B01D 46/2411 55/467 |
| 8,157,881 | B1 * | 4/2012 | Anoszko | B01D 46/0006 55/497 |
| 8,241,380 | B2 * | 8/2012 | Hoffer | F24F 13/28 55/506 |
| 8,623,109 | B2 * | 1/2014 | Anoszko | B01D 46/521 55/497 |
| 8,647,405 | B2 * | 2/2014 | Gray, Jr. | B01D 46/0002 55/506 |
| 10,234,150 | B2 * | 3/2019 | Noh | B01D 46/4227 |
| 10,493,391 | B2 | 12/2019 | Luley et al. | |
| 2002/0029549 | A1 * | 3/2002 | Baumann | B01D 46/10 55/385.3 |
| 2002/0090907 | A1 * | 7/2002 | Barber | B01D 46/521 62/317 |
| 2003/0131572 | A1 * | 7/2003 | Roudet | B60H 3/0616 55/385.3 |
| 2004/0118093 | A1 * | 6/2004 | Chang | B01D 46/0006 55/482 |
| 2004/0172927 | A1 * | 9/2004 | Lee | F24F 13/28 55/495 |
| 2005/0044688 | A1 * | 3/2005 | Wynn | H05K 7/20181 29/525 |
| 2005/0097870 | A1 * | 5/2005 | Moshenrose | B01D 53/32 55/385.1 |
| 2005/0160708 | A1 * | 7/2005 | Iantorno | B01D 46/10 55/482 |
| 2005/0204922 | A1 * | 9/2005 | Wu | B01D 46/64 55/496 |
| 2007/0095037 | A1 * | 5/2007 | McLamb | B01D 46/10 55/495 |
| 2008/0110146 | A1 * | 5/2008 | Germain | F02M 35/024 55/385.3 |
| 2008/0148695 | A1 * | 6/2008 | Terres | B01D 46/0006 55/355 |
| 2008/0216455 | A1 * | 9/2008 | Aizawa | B01D 46/521 55/481 |
| 2009/0126679 | A1 * | 5/2009 | Hoffer | F24F 13/28 123/198 E |
| 2010/0313535 | A1 * | 12/2010 | Crook | B01D 46/0004 428/34.1 |
| 2012/0111197 | A1 * | 5/2012 | Weisman | B01D 46/0009 55/505 |
| 2013/0133301 | A1 * | 5/2013 | Sproule | B01D 46/521 55/501 |
| 2014/0150385 | A1 * | 6/2014 | Schuld | B01D 46/10 55/497 |
| 2017/0151519 | A1 * | 6/2017 | Wu | B01D 46/10 |
| 2018/0147518 | A1 * | 5/2018 | Addington | B01D 46/0005 |
| 2020/0101408 | A1 * | 4/2020 | Brown | F24F 1/0073 |
| 2023/0097000 | A1 * | 3/2023 | Jolliffe | B01D 46/10 55/357 |
| 2025/0001342 | A1 * | 1/2025 | Davis | B01D 46/10 |

FOREIGN PATENT DOCUMENTS

| | | |
|---|---|---|
| CN | 206073426 U | 4/2017 |
| CN | 206191859 U | 5/2017 |
| CN | 206281080 U | 6/2017 |
| CN | 208901570 U | 5/2019 |
| CN | 209761235 U | 12/2019 |
| CN | 111637558 A | 9/2020 |
| CN | 211854308 U | 11/2020 |
| CN | 212276682 U | 1/2021 |
| CN | 212408932 U | 1/2021 |
| CN | 213931307 U | 8/2021 |
| KR | 100512416 B1 | 9/2005 |
| KR | 20090042525 A | 4/2009 |

* cited by examiner

DUCT MOUNTED FILTERING APPARATUS

CROSS-REFERENCE TO RELATED APPLICATIONS

This application claims the benefit of U.S. Provisional Application No. 63/250,384 filed Sep. 30, 2021, the disclosure of which is incorporated herein by reference in its entirety.

BACKGROUND

Exemplary embodiments pertain to a heating, ventilation, and air conditioning (HVAC) system, and more particularly to an air cleaner associated with an HVAC system.

Heating, ventilation, and air conditioning (HVAC) systems, such as that deliver forced air to an area being conditioned for example, commonly filter the air that passes through the system. The most common types of filters are simple mechanical filters that remove particulates from the air stream as it flows therethrough. A chemical filtration capability can also be added by the insertion of certain materials such as carbon, to remove certain undesirable chemicals.

Existing filters may be damaged during installation or removal from an HVAC system. Filters are often pulled into a neighboring blower compartment making the filter particularly difficult to remove. Further, because the filter is typically loaded with contaminants and other particulate matter when the filter is removed, careful handling is required to minimized the redistribution of such contaminants into the airstream of the HVAC system.

BRIEF DESCRIPTION

According to an embodiment, a filter support for mounting an air cleaning device includes an access panel, at least one support member extending from the access panel, and a latch mounted to the access panel. The latch is operable to selectively couple to the air cleaning device.

In addition to one or more of the features described above, or as an alternative to any of the foregoing embodiments the at least one support member includes a first support member and a second support member and a clearance for receiving the air cleaning device is defined between the first support member and the second support member.

In addition to one or more of the features described above, or as an alternative to any of the foregoing embodiments at least one of the first support member and the second support member is movable relative to the access panel.

In addition to one or more of the features described above, or as an alternative to any of the foregoing embodiments the at least one of the first support member and the second support member is movable relative to a width of the access panel.

In addition to one or more of the features described above, or as an alternative to any of the foregoing embodiments the first support member and the second support member are movable relative to the access panel independently.

In addition to one or more of the features described above, or as an alternative to any of the foregoing embodiments the first support member and the second support member are movable relative to the access panel in unison.

In addition to one or more of the features described above, or as an alternative to any of the foregoing embodiments the latch further comprises at least one engagement member movable relative to the access panel to selectively couple to the air cleaning device.

In addition to one or more of the features described above, or as an alternative to any of the foregoing embodiments the latch further comprises an actuation mechanism operably coupled to the at least one engagement member.

In addition to one or more of the features described above, or as an alternative to any of the foregoing embodiments the at least one engagement member is movable between a retracted position and an extended position, and the actuation mechanism is operable to move the at least one engagement member to the retracted position.

In addition to one or more of the features described above, or as an alternative to any of the foregoing embodiments the at least one engagement member is biased into the extended position.

In addition to one or more of the features described above, or as an alternative to any of the foregoing embodiments the actuation mechanism is operable to move the at least one engagement member to the extended position.

In addition to one or more of the features described above, or as an alternative to any of the foregoing embodiments the at least one support member is arranged at a first side of the access panel and the actuation mechanism is arranged at a second, opposite side of the access panel.

According to an embodiment, a heating, ventilation, and air conditioning (HVAC) system includes a duct having an opening formed at a side thereof, a filter support movably mounted to the duct, and an air cleaning device connected to the filter support. The filter support and the air cleaning device are installed within the duct via the opening.

In addition to one or more of the features described above, or as an alternative to any of the foregoing embodiments the air cleaning device is a collapsible filter.

In addition to one or more of the features described above, or as an alternative to any of the foregoing embodiments the air cleaning device is a box filter.

According to an embodiment, a method of installing an air cleaning device in a duct of a heating, ventilation and air conditioning system includes adjusting a clearance of a filter support, positioning the air cleaning device within the clearance, coupling a latch of the filter support to the air cleaning device, and installing the filter support and the air cleaning device within the duct.

In addition to one or more of the features described above, or as an alternative to any of the foregoing embodiments coupling the latch of the filter support to the air cleaning device further comprises: transforming an engagement member of the latch to an extended position, wherein in the extended position, the engagement member is arranged within a slot formed in the air cleaning device.

In addition to one or more of the features described above, or as an alternative to any of the foregoing embodiments the filter support further comprises at least one support member and positioning the air cleaning device within the clearance further comprises positioning the at least one support member of the filter support between opposite end caps of the air cleaning device.

In addition to one or more of the features described above, or as an alternative to any of the foregoing embodiments the filter support further comprises at a first support member and a second support member extending from an access panel and adjusting the clearance defined by at the filter support further comprises moving at least one of the first support member and the second support member relative to the access panel.

In addition to one or more of the features described above, or as an alternative to any of the foregoing embodiments further comprising removing the filter support and the air cleaning device from the duct and operating the latch to decouple the air cleaning device from the filter support.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
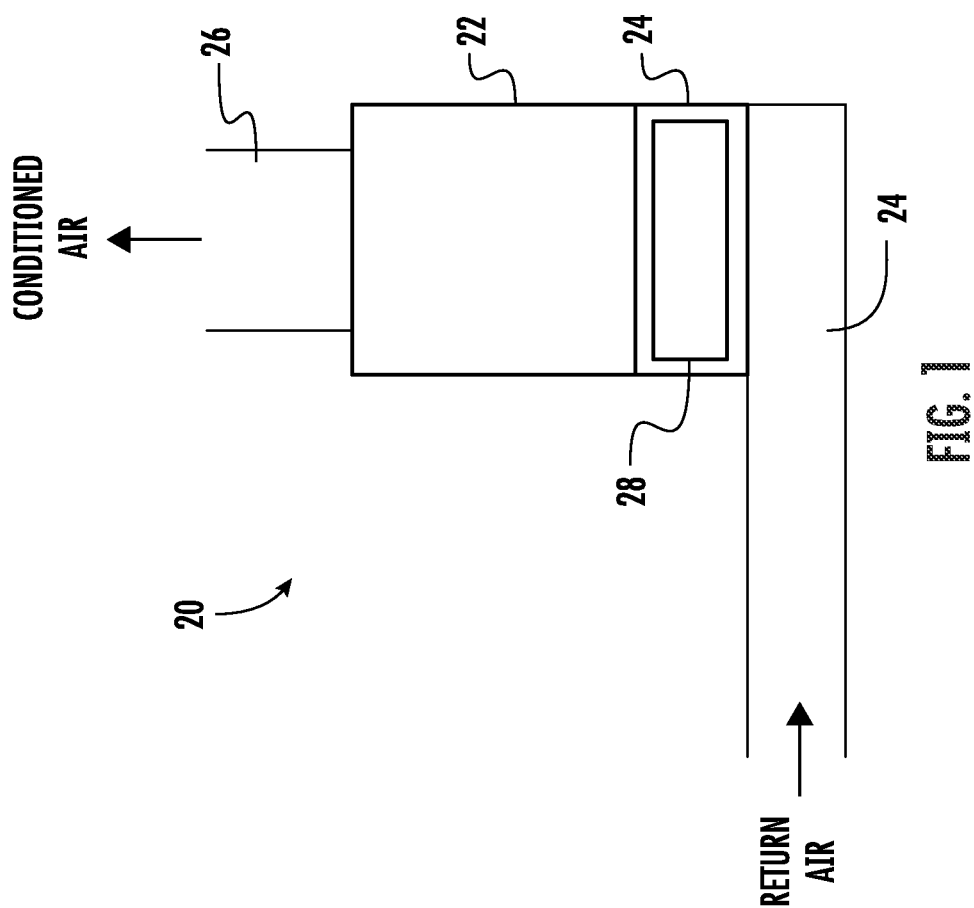
FIG. 1 is a schematic diagram of an example of a portion of a heating, ventilation, and air conditioning (HVAC) system.
Figure 2:
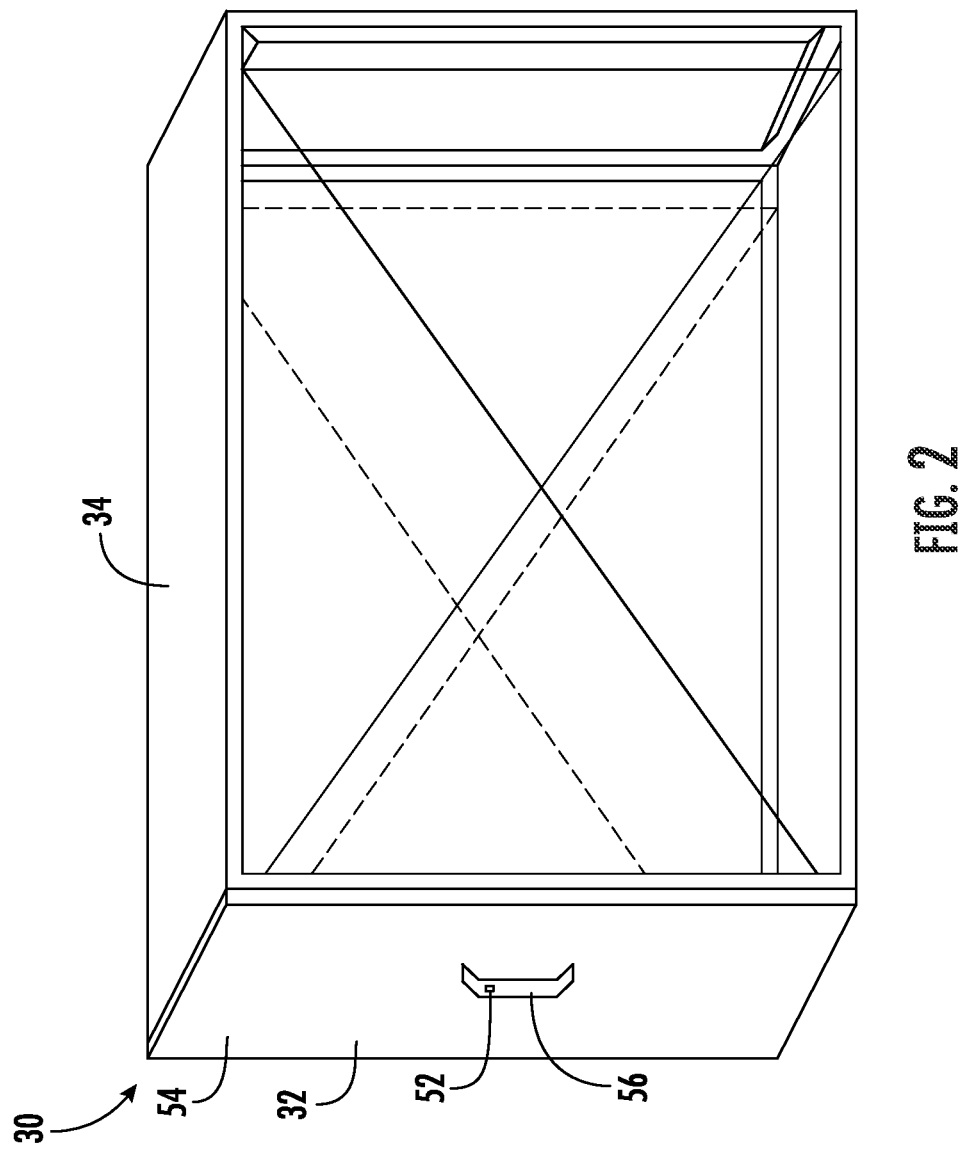
FIG. 2 is a perspective view of an exemplary air cleaning device arranged within a duct of an HVAC system according to an embodiment.
Figure 3:
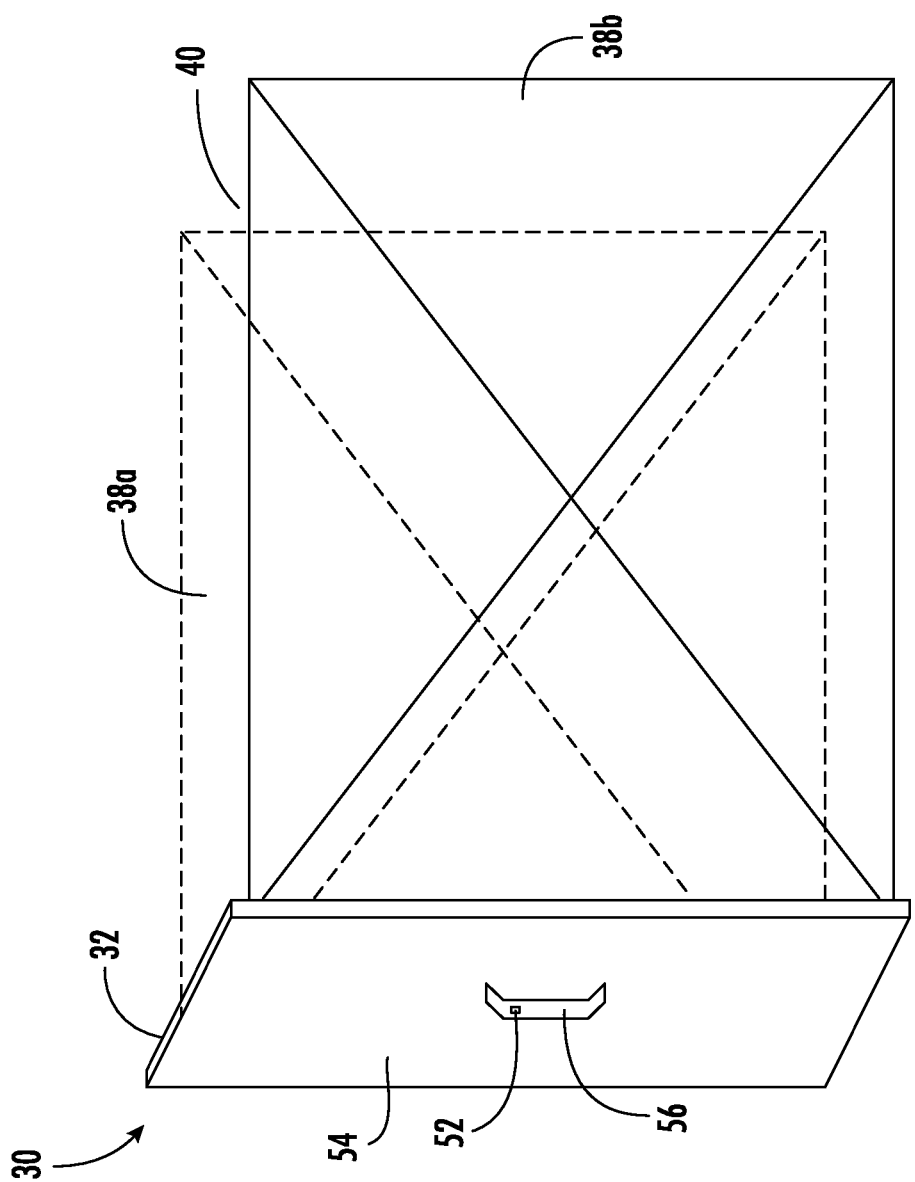
FIG. 3 is a perspective view of a support assembly according to an embodiment.

With reference now to FIG. 1, a schematic diagram of a portion of a heating, ventilation, and air conditioning (HVAC) system 20 used to provide a flow of conditioned air to an area, such as a building or a portion of a building for example, is shown. In the illustrated, non-limiting embodiment, the HVAC system 20 is a forced air system including a heat exchanger 22, such as furnace and/or an air coil for example, a return air duct 24, and an outlet duct 26. In operation, air is configured to flow vertically upward from the return air duct 24, through the heat exchanger 22 to one or more outlet ducts 26 used to deliver the conditioned air to a desired area of the building.

At least one air cleaning device 28 may be supported within the air stream of the HVAC system 20. As shown, an air cleaning device 28 may be arranged directly upstream from the heat exchanger 22. However, embodiments where an air cleaning device is arranged at another location, such as within the return air duct 24, and/or within an outlet duct 26 downstream from the heat exchanger 22 are also within the scope of the disclosure. The air cleaning device 28 may be mounted within the existing ductwork of the system 20; however, embodiments where the air cleaning device 28 is mounted within a cabinet or housing supporting the heat exchanger 22, such as the furnace housing for example are within the scope of the disclosure. Further, in other embodiments, the air cleaning device 28 may be mounted within a separate component, such as an air cleaner cabinet or filter cabinet, disposed upstream or downstream form the heat exchanger 22 relative to the air flow. It should be understood that the HVAC system 20 illustrated and described herein is intended as an example only and that an HVAC system 20 having another configuration is also within the scope of the disclosure.

The air cleaning device 28 may be mounted within the air flow of the HVAC system 20 via a filter support 30. With reference now to FIGS. 2-5, an example of a filter support 30 is illustrated in more detail. As shown, the filter support 30 includes a door or access panel 32 that is connectable to or receivable within an opening formed in a corresponding duct or housing, illustrated at 34, of the HVAC system 20. In an embodiment, a height and width of the access panel 32 is substantially the same as the height and width of the air cleaning device 28 when installed within the air flow.

Extending from a first side 36 of the access panel 32 configured to face an interior of the duct or housing 34 of the HVAC system 20 is at least one support member, such as a first support member 38a and a second support member 38b. Although two support members 38a, 38b are illustrated, it should be understood that embodiments having a single support member are also within the scope of the disclosure. The first and second support members 38a, 38b are separated from one another to define a clearance 40 within which an air cleaning device 28 is receivable. In an embodiment, at least one of the first support member 38a and the second support member 38b is movably mounted to the access panel 32 to vary the size of the clearance 40 for receiving an air cleaning device 28. For example, the first support member 38a may be translatable along an axis extending parallel to the width of the access panel 32. In an embodiment, both the first support member 38a and the second support member 38b are translatable along the axis extending parallel to the width of the access panel 32 to vary the width of the clearance 40 for receiving the air cleaning device 28. In such embodiments, the first and second support members 38a, 38b may be movable independently of one another. Alternatively, the first and second support members 38a, 38b may be coupled together such that the a corresponding movement is imparted to both support members 38a, 38b. By coupling the movement of the first and second support member 38a, 38b, the clearance 40 defined between the first and second support members 38a, 38b remains centered relative to the access panel 32. Although the movement of the support members 38a, 38b is described herein as being relative to the width of the access panel 32, it should be understood that embodiments where one or more of the support members 38a, 38b is alternatively or additionally movable in another direction, such as relative to the height of the access panel 32 for example, are also within the scope of the disclosure.

The first and second support member 38a, 38b may have any suitable construction and may be formed from any material, such as metal or plastic for example. For example, the support members 38a, 38b may be formed from a solid, thin piece of material, or alternatively, may have one or more openings formed therein to reduce the weight of the filter support 30. In embodiments where the support members 38a, 38b have one or more openings, the support members 38a, 38b may be formed from a grid or mesh, or may have a frame like construction with one or more cross pieces such that the openings of the support members 38a, 38b are smaller than any of the air cleaning devices 28 suitable for use therewith.

Although the first and second support member 38a, 38b are illustrated as extending over the substantially entire height of the access panel 32, embodiments where one or both of the first support member 38a and the second support member 38b has a height less than the height of the access panel 32 and/or less than a height of the air cleaning device 28 is contemplated herein. For example, the height of the first and/or second support member 38a, 38b may be anywhere between about 50% of the height of the access panel 32 and/or air cleaning device 28 and about 100% of the height of the access panel 32 and/or air cleaning device 28.

Further, as noted above, the height of the first and/or second support member 38a, 38b may be adjustable to adapt to an air cleaning device 28.

The first and second support members 38a, 38b are illustrated as having substantially identical configurations. However, it should be understood that the configuration of the support members 38a, 38b may be dependent on the configuration of the air cleaning device 28 being used therewith, and therefore embodiments where the configuration of the first support member 38a and the second support member 38b vary are also contemplated herein.

The filter support 30 may further include a latch 42 having one or more engagement members 44 movable to selectively couple to a portion of the air cleaning device 28. As shown, at least a portion of the latch 42 is mounted within a channel 46 formed at the first side 36 of the access panel 32. In an embodiment, the latch 42 includes a first engagement member 44 arranged at a first end 48 of the channel 46, near a first end of the air cleaning device 28, and a second engagement member 44 arranged at a second, opposite end 50 of the channel 46, near a second, opposite end of the air cleaning device 28. However, embodiments having only a single engagement member 44, or alternatively, more than two engagement members 44 are also within the scope of the disclosure.

The latch 42 may additionally include an actuation mechanism 52 (see FIGS. 3 and 5), for example exposed at the second side 54 of the access panel 32. In the illustrated, non-limiting embodiment, the actuation mechanism 52 is illustrated as a button formed in a handle 56, however in other embodiments, the handle 56 itself may be configured to function as the actuation mechanism.

Figure 4:
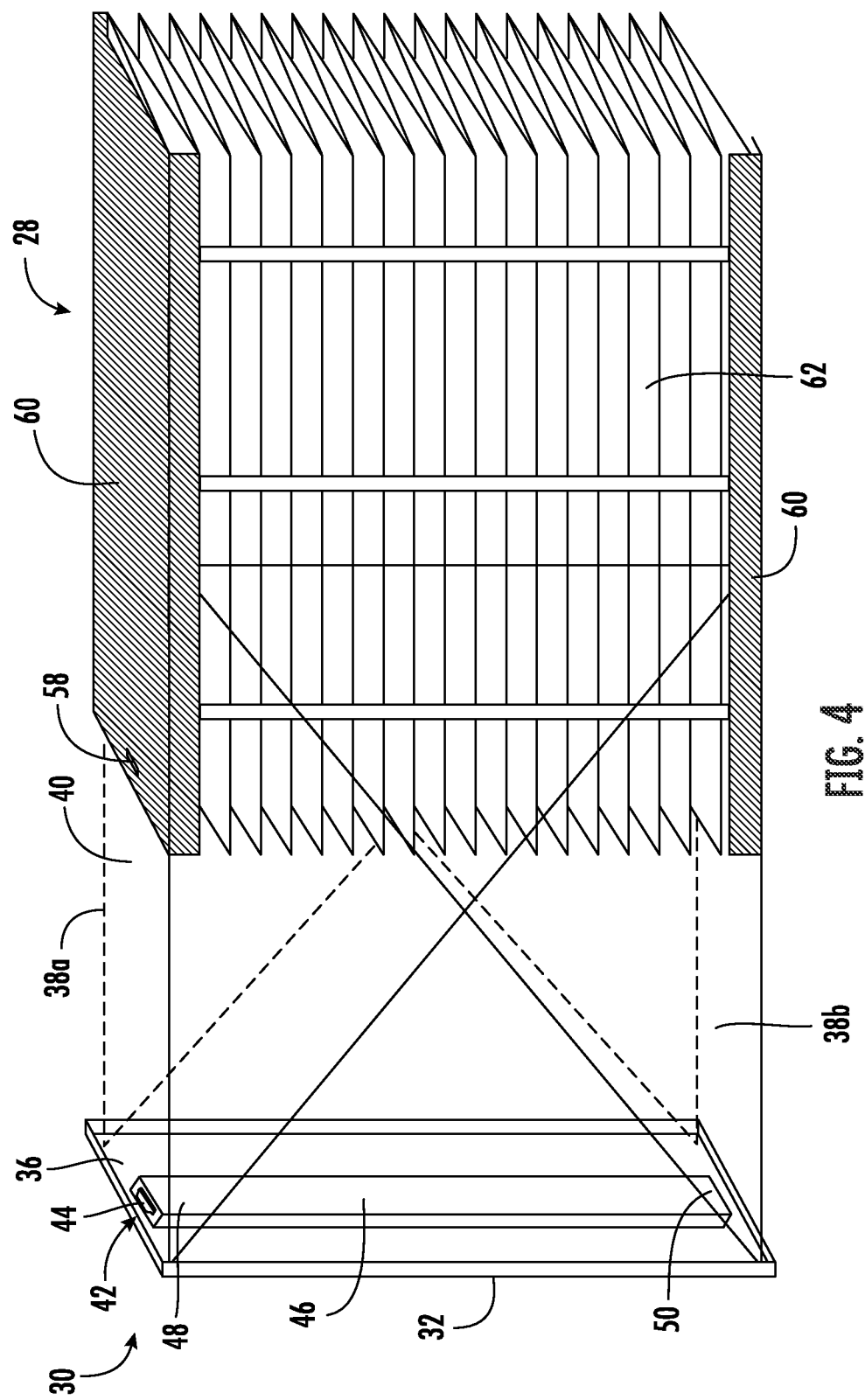
FIG. 4 is a perspective view of a support assembly partially installed about an air cleaning device according to an embodiment.
Figure 5:
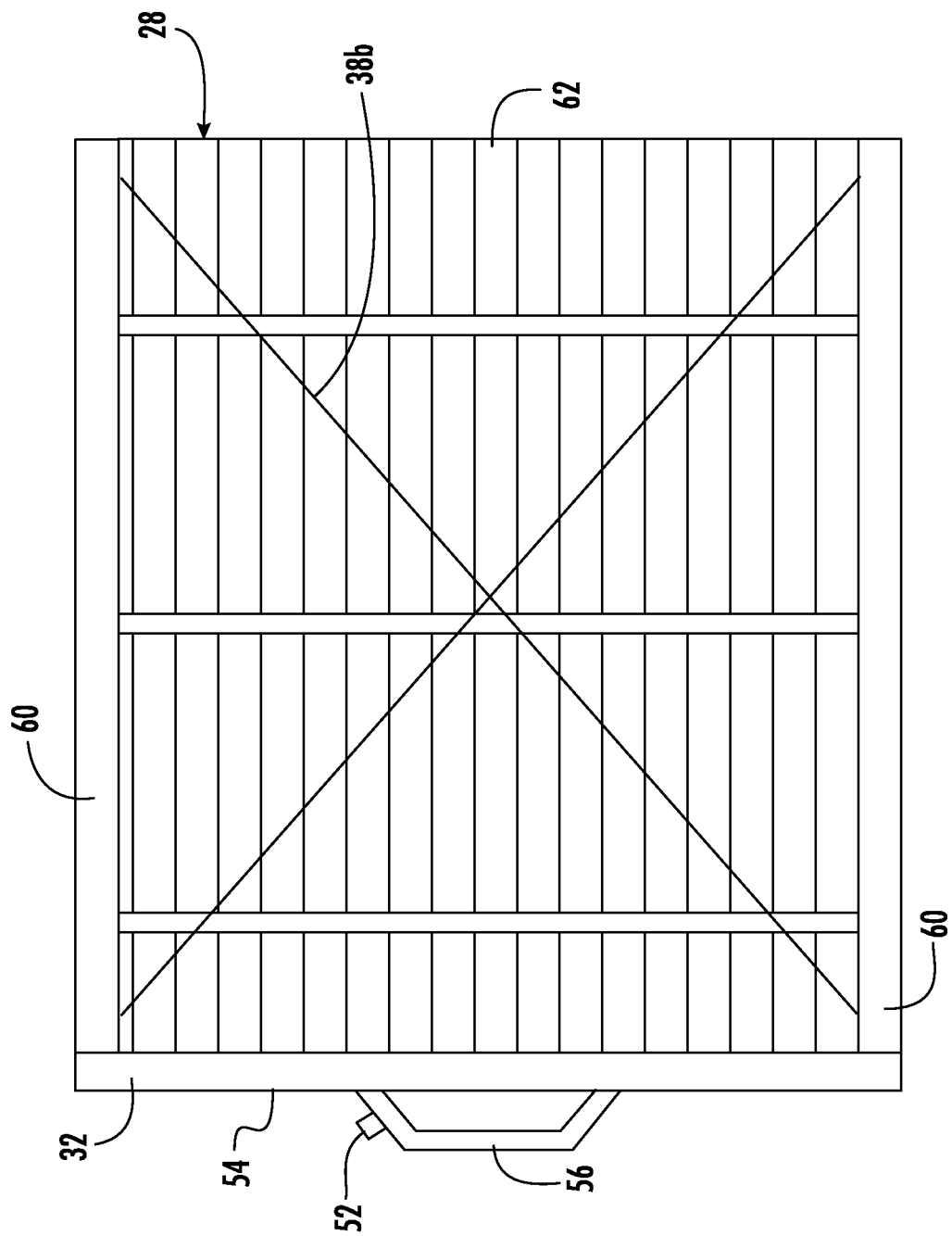
FIG. 5 is a perspective view of a support assembly installed about an air cleaning device according to an embodiment.

The at least one engagement member 44 of the latch 42 is movable between a retracted position (not shown) and an extended position (FIG. 4). In an embodiment, when the at least one engagement member 44 is in the retracted position, all or at least a portion of the engagement member 44 is arranged within the interior of the channel 46. When the at least one engagement member 44 is in the retracted position, the air cleaning device 28 is not coupled to the filter support 30. In the extended position, all or at least a portion of the engagement member 44 protrudes beyond the channel 46. Accordingly, in the extended position, the at least one engagement member 44 is configured to couple to the air cleaning device 28. For example, the extended engagement member 44 may be receivable within a corresponding slot 58 (see FIG. 4) formed in the air cleaning device 28 to couple the air cleaning device 28 to the filter support 30.

In an embodiment, the at least one engagement member 44 is biased outwardly into the extended position. In such embodiments, operation of the actuation mechanism 52 is configured to oppose the biasing force of the biasing mechanism (not shown) associated with the engagement members 44, to move the at least one engagement member 44 from the extended position to the retracted position. However, in other embodiments, the at least one engagement member 44 may be transformed to both the retracted position and the extended position in response to operation of the actuation mechanism 52. For example, the actuation mechanism 52 operably coupled to the at least one engagement member 44 may be a push-push mechanism. However, it should be understood that any suitable actuation mechanism 52 is within the scope of the disclosure.

A method of installing the air cleaning device 28 within the filter support includes adjusting a position of the one or more support members 38a, 38b such that a width of the clearance 40 is generally equal to the width of the air cleaning device 28. The air cleaning device is then moved, such as slid for example, relative to the support members 38a, 38b into the clearance 40. In embodiments where the air cleaning device 28 is a collapsible filter having two end caps 60 and a filter material 62 extending therebetween, the end caps 60 may be configured to engage a side surface of the support members 38a, 38b. In such embodiments, this engagement helps to maintain the air cleaning device 28 in an extended configuration. However, it should be understood that the filter support 30 is suitable for use with an air cleaning device having another configuration, such as a box filter for example.

Once the air cleaning device 28 is fully inserted into the clearance 40, the latch 42 is operated, thereby causing the engagement members 44 to transform to an extended position in which the engagement member is coupled to or engaged with the air cleaning device 28. In this configuration, the air cleaning device 28 is coupled to the filter support. Accordingly, the air cleaning device 28 is inserted via the filter support 30 through an opening formed in the duct 34 into the air flow path of the HVAC system 20. In an embodiment, the wall of the duct 34 opposite the opening may be contoured or raised such that the surface of the wall generally abuts or even applies a force to the end of the air cleaning device 28. This contact or engagement can minimize the amount of the airflow that bypasses the air cleaning device 28.

To remove the air cleaning device 28, the filter support 30 is separated from the duct 34 via the opening formed therein. Once positioned over a garbage, the actuation mechanism 52 may be operated, causing the engagement members 44 to retract. As a result of this decoupling, the air cleaning device 28 will fall via gravity from the filter support 30 into the garbage.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A filter support for mounting an air cleaning device within an air duct comprising:

an access panel;
at least one support member extending from the access panel; and
a latch mounted to the access panel, the latch being operable to selectively couple to the air cleaning device, wherein the air cleaning device engaged with the latch is removably mountable within the air duct.

2. The filter support of claim 1, wherein the at least one support member includes a first support member and a second support member and a clearance for receiving the air cleaning device is defined between the first support member and the second support member.

3. The filter support of claim 2, wherein at least one of the first support member and the second support member is movable relative to the access panel.

4. The filter support of claim 3, wherein the at least one of the first support member and the second support member is movable relative to a width of the access panel.

5. The filter support of claim 3, wherein the first support member and the second support member are movable relative to the access panel independently.

6. The filter support of claim 3, wherein the first support member and the second support member are movable relative to the access panel in unison.

7. The filter support of claim 1, wherein the latch further comprises at least one engagement member movable relative to the access panel to selectively couple to the air cleaning device.

8. The filter support of claim 7, wherein the latch further comprises an actuation mechanism operably coupled to the at least one engagement member.

9. The filter support of claim 8, wherein the at least one engagement member is movable between a retracted position and an extended position, and the actuation mechanism is operable to move the at least one engagement member to the retracted position.

10. The filter support of claim 9, wherein the at least one engagement member is biased into the extended position.

11. The filter support of claim 9, wherein the actuation mechanism is operable to move the at least one engagement member to the extended position.

12. The filter support of claim 9, wherein the at least one support member is arranged at a first side of the access panel and the actuation mechanism is arranged at a second, opposite side of the access panel.

13. A heating, ventilation, and air conditioning (HVAC) system comprising:

a duct having an opening formed at a side thereof;
a filter support movably mounted to the duct; and
an air cleaning device connectable to the filter support via a latch arranged at the filter support, the filter support coupled to the air cleaning device being installed within the duct via the opening.

14. The HVAC system of claim 13, wherein the air cleaning device is a collapsible filter.

15. The HVAC system of claim 13, wherein the air cleaning device is a box filter.

16. A method of installing an air cleaning device in a duct of a heating, ventilation and air conditioning system, comprising:
adjusting a clearance of a filter support;
positioning the air cleaning device within the clearance;
coupling the filter support to the air cleaning device via a latch; and
installing the filter support and the air cleaning device within the duct, wherein coupling the filter support to the air cleaning device via the latch occurs prior to installing the filter support and the air cleaning device within the duct.

17. The method of claim 16, wherein coupling the latch of the filter support to the air cleaning device further comprises:
transforming an engagement member of the latch to an extended position, wherein in the extended position, the engagement member is arranged within a slot formed in the air cleaning device.

18. The method of claim 16, wherein the filter support further comprises at least one support member and positioning the air cleaning device within the clearance further comprises positioning the at least one support member of the filter support between opposite end caps of the air cleaning device.

19. The method of claim 16, wherein the filter support further comprises at a first support member and a second support member extending from an access panel and adjusting the clearance defined by at the filter support further comprises moving at least one of the first support member and the second support member relative to the access panel.

20. The method of claim 16, further comprising:
removing the filter support and the air cleaning device from the duct; and
operating the latch to decouple the air cleaning device from the filter support.

* * * * *